Dec. 18, 1923.                                           1,477,908
                      B. F. SEYMOUR
             RESILIENT TRANSMISSION AND BEARING
                Filed June 7, 1919        2 Sheets-Sheet 1
Fig. 1.
Fig. 2.
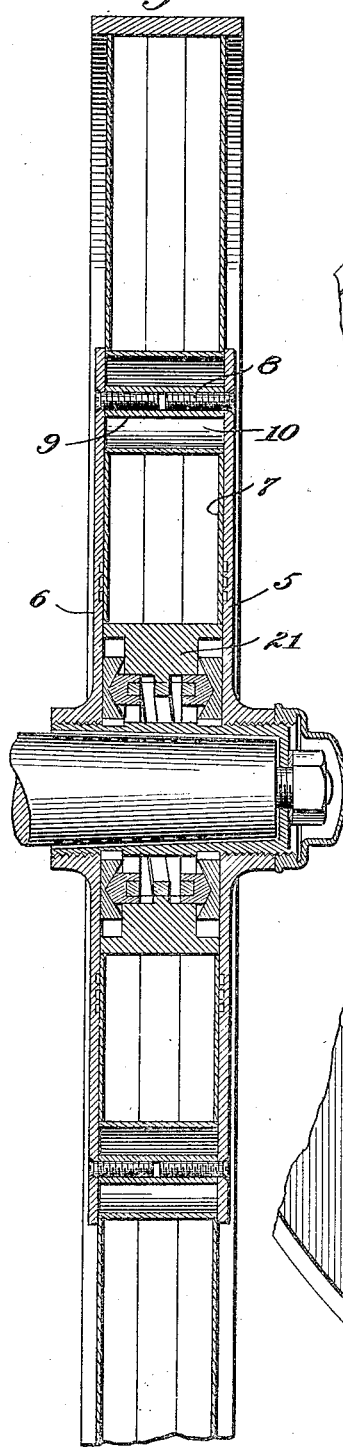
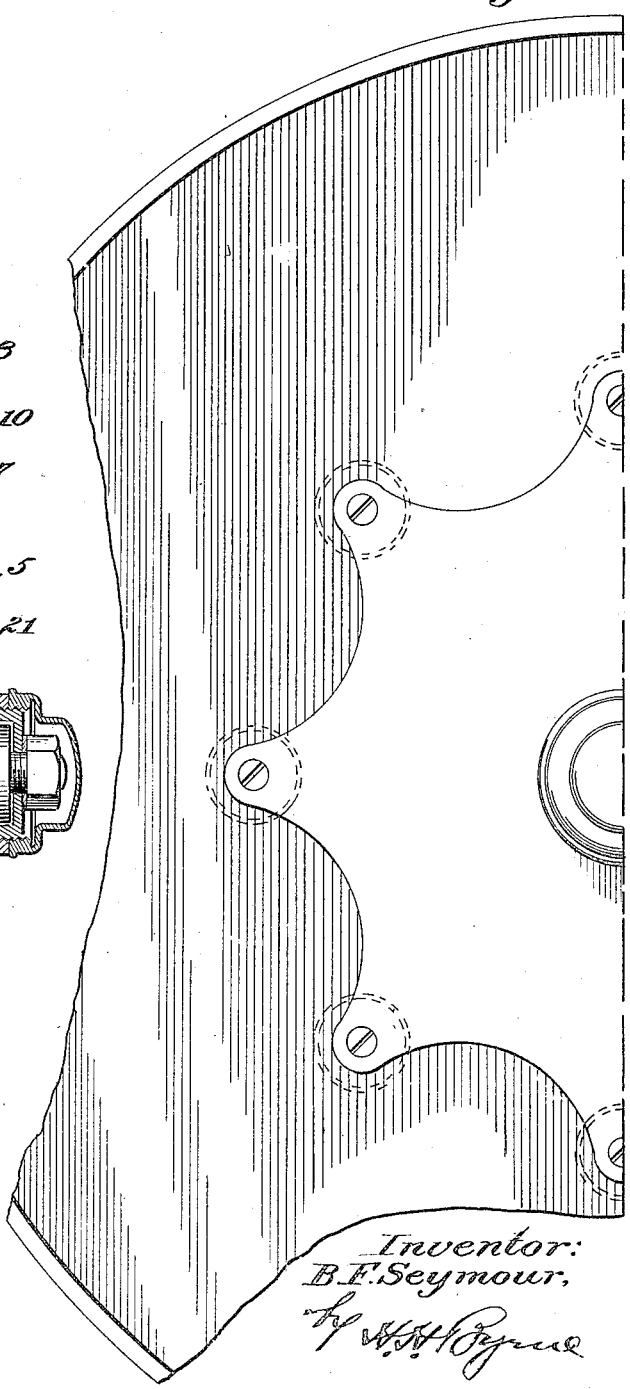
Inventor:
B. F. Seymour,
Att'y.

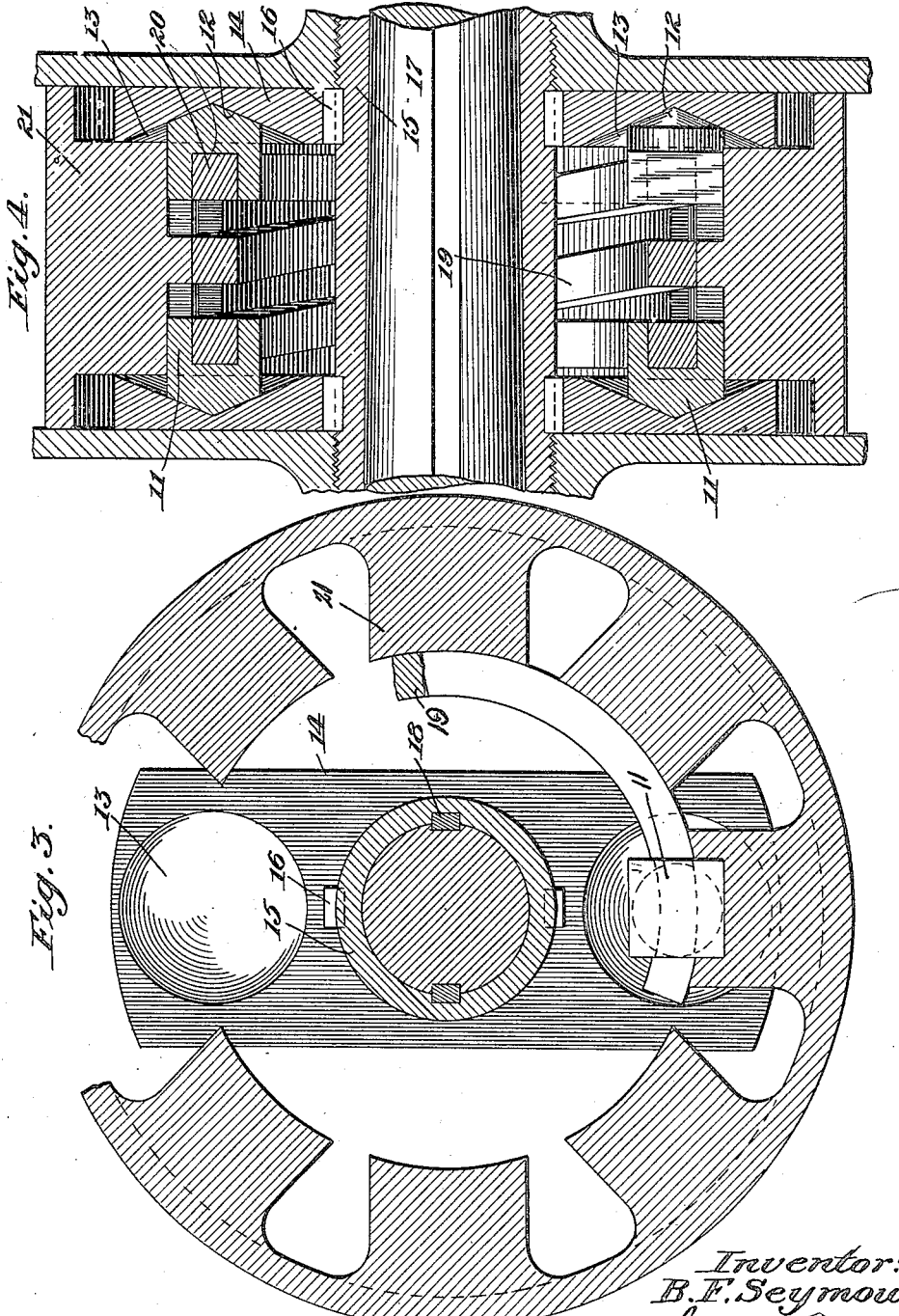

Patented Dec. 18, 1923.

1,477,908

UNITED STATES PATENT OFFICE.

BENJAMIN F. SEYMOUR, OF WASHINGTON, DISTRICT OF COLUMBIA.

RESILIENT TRANSMISSION AND BEARING.

Application filed June 7, 1919. Serial No. 302,414.

*To all whom it may concern:*

Be it known that I, BENJAMIN F. SEYMOUR, a citizen of the United States, residing at Washington, in the District of Columbia, have invented certain new and useful Improvements in Resilient Transmissions and Bearings; and I do hereby declare the following to be a full, clear, and exact description of the invention, such as will enable others skilled in the art to which it appertains to make and use the same.

The present invention relates to resilient transmissions and bearings, more particularly for vehicle wheels, and consists in the combinations and arrangements of elements hereinafter described and particularly set forth in the accompanying claims.

The purpose of the invention is to provide a flexible or resilient transmission between a driving and a driven element adapted to positively transmit the driving force whether said elements are in or out of concentric relation; and one which will readily accommodate itself under all normal working conditions to which said elements may be subjected.

A further purpose of the invention is to provide a combined resilient transmission and bearing for a vehicle wheel to the end that such a wheel may possess the desired resilient qualities and also give the necessary transmission medium between the wheel proper and the motive power of the vehicle.

The invention is shown by way of illustration in the accompanying drawings, wherein—

Figure 1 is a central sectional view of a vehicle wheel showing the application of the invention;

Fig. 2, a side elevational view thereof;

Fig. 3, a transverse sectional view of the wheel hub on an enlarged scale; and

Fig. 4, a central sectional view thereof.

Referring to the construction in further detail and wherein like reference characters designate corresponding parts, the construction consists of a hub portion formed of two side plates or housing members 5 and 6, which provide bearing portions against which the inner rim portion 7 works in the limited radial movement which the wheel rim has with respect to the hub, as will be understood. The two hub members 5 and 6 are secured to the wheel rim by the series of securing bolts 8 arranged in pairs and carrying spacing members 9, as shown. In each of said connecting devices the wheel rim is provided with a clearance space 10 immediately surrounding said devices to allow the wheel rim to have the necessary limited radial movement.

The resilient transmitting and bearing device per se consists of two pairs of blocks 11 diametrically disposed and formed on their outer portions with cone surfaces 12 (see Fig. 4) that co-operate with complemental surfaces 13 formed on the inner faces of the two bars 14, having substantially the shape shown in Fig. 3, and which are secured to the hub sleeve 15 by the keys 16, and said sleeve 15 is in turn secured to the driving axle 17 of the vehicle by the keys 18, fitting in suitable keyways formed in said axle and sleeve, as shown.

A volute spring 19 supports the several cone blocks 11 by fitting in the recesses 20 formed in said blocks, and said blocks and the spring in turn support the inner annular portion 21 of the wheel rim in a manner that permits said rim to move transversely of the axle 17 with the necessary degree of resiliency. And in their driving function the elements 11 and 14 respectively co-act to impart transmission to the wheel rim from the positive drive of the shaft 17. Said rim portion 21 is suitably cut away on its inner portion, as indicated in Fig. 3, to reduce weight of metal, and also limit the frictional bearing of the spring 19 thereon.

It will therefore be seen that turning of the shaft 17 will transmit rotation to the wheel rim through the medium of the cam blocks and hub, and that such transmission will be flexible or resilient in nature. It will also be seen that any jarring imparted to the wheel rim will be taken up by the cooperating cam elements described. In effect the floating rim portion is resiliently supported by the hub circumferential spring 19 which holds said cone elements under tension axially of the hub.

It will be obvious, of course, that different forms of construction may be provided in lieu of that disclosed and described herein. And while I have shown and described certain apparatus for accomplishing the result initially stated, it is to be understood that I am not limited to the precise details shown but may on the other hand adopt such modifications or changes within the scope of the claims as will better suit the end in view.

Having thus described my invention, what I claim is:

1. In a combined resilient bearing and transmission for vehicle wheels the combination of a hub member, a rim member floatingly mounted on the hub member, cooperable cam elements associated with said rim and hub members respectively, and a spring circumferential of the hub engaging the rim and cooperable with said cam elements, substantially as set forth.

2. In a combined resilient bearing and transmission for vehicle wheels the combination of a hub member, a rim member floatingly mounted on the hub member, cooperable cam elements associated with said rim and hub members respectively, and a spring circumferential of the hub engaging the rim and axially tensioning said cam elements and cooperable therewith to radially support the rim member.

3. In a combined resilient bearing and transmission for vehicle wheels, the combination of a hub member, a wheel rim mounted to have limited radial movement on said hub member, a plurality of diametrically disposed pairs of cone-elements carried by the hub member, a plurality of diametrically disposed pairs of cone members carried by and separably movable on the rim members and engaging with the cone members of the hub, and resilient means circumferential of the hub having supporting engagement with the rim and normally holding said cone elements in co-operable relation and providing a bearing and transmission, substantially as set forth.

4. In a combined resilient bearing and transmission for vehicle wheels, the combination of a hub member, a rim member mounted to have limited radial movement on said hub member, a plurality of pairs of female cone elements carried by the hub member, a plurality of pairs of male cone elements carried by and separably movable on the rim member and co-operable with the cone elements of the hub member, and a spring circumferential of the hub interposed between said rim cone elements and normally holding the same in engagement and sustaining said rim member, substantially as set forth.

5. In a combined resilient bearing and transmission, the combination of a hub member having side plates, a rim member mounted to have limited radial movement therebetween, a plurality of diametrically disposed cone elements mounted on said side plates at the hub, a plurality of diametrically disposed cone heads separably movable on the rim member and co-operable with the cone elements of the hub member, and a spring surrounding the hub and carrying the cone elements of the rim member, and holding the same in engagement with the cone elements of the hub member and sustaining said rim member, substantially as described.

In testimony whereof I affix my signature.

BENJAMIN F. SEYMOUR.